United States Patent
King et al.

(10) Patent No.: US 10,364,697 B2
(45) Date of Patent: Jul. 30, 2019

(54) ACTUATING MECHANISM AND GEAR DRIVEN ADJUSTMENT RING FOR A VARIABLE GEOMETRY TURBOCHARGER

(71) Applicant: BorgWarner Inc., Auburn Hills, MI (US)

(72) Inventors: Matthew King, Arden, NC (US); Jason W. Chekansky, Asheville, NC (US); Frederick Huscher, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 531 days.

(21) Appl. No.: 15/023,738

(22) PCT Filed: Sep. 25, 2014

(86) PCT No.: PCT/US2014/057378
§ 371 (c)(1),
(2) Date: Mar. 22, 2016

(87) PCT Pub. No.: WO2015/048238
PCT Pub. Date: Apr. 2, 2015

(65) Prior Publication Data
US 2016/0230586 A1 Aug. 11, 2016

Related U.S. Application Data

(60) Provisional application No. 61/884,289, filed on Sep. 30, 2013.

(51) Int. Cl.
*F01D 17/16* (2006.01)
*F16H 19/04* (2006.01)

(52) U.S. Cl.
CPC ......... *F01D 17/165* (2013.01); *F16H 19/04* (2013.01); *F05D 2220/40* (2013.01)

(58) Field of Classification Search
CPC .... F01D 17/165; F05D 2220/40; F16H 19/04; F16H 19/043
See application file for complete search history.

(56) References Cited

U.S. PATENT DOCUMENTS 3,723,022 A * 3/1973 Olson ..................... F01D 5/043
184/6.28
4,218,933 A * 8/1980 Allen ...................... B62D 3/12
384/291

(Continued)

FOREIGN PATENT DOCUMENTS

| CN | 101446229 A | 6/2009 |
| JP | 2000291440 A | 10/2000 |
| JP | 2006528303 A | 12/2006 |

OTHER PUBLICATIONS

International Search Report and Written Opinion; dated Jan. 27, 2015; for International Application No. PCT/US2014/057378; 10 pages.

(Continued)

*Primary Examiner* — Matthew W Jellett
(74) *Attorney, Agent, or Firm* — BrooksGroup

(57) ABSTRACT

A variable geometry turbine turbocharger (1) includes a gear driven adjustment ring actuator mechanism (300) supported within a housing (16) via a resilient mount (70) disposed between the mechanism (300) and housing (16). The gear driven adjustment ring actuator mechanism (300) rotates an adjustment ring (350), which in turn adjusts the position of the vanes (30) of the variable geometry turbine (2). The resilient mount (70) accommodates the heat-related expansion and contraction of the gear driven adjustment ring actuator mechanism (300).

12 Claims, 8 Drawing Sheets

(56) References Cited

U.S. PATENT DOCUMENTS

| | | | | |
|---|---|---|---|---|
| 4,274,329 A | * | 6/1981 | Weyer | F01B 9/047 |
| | | | | 414/735 |
| 4,403,913 A | * | 9/1983 | Fisker | F04D 29/46 |
| | | | | 415/150 |
| 4,502,836 A | * | 3/1985 | Swearingen | F01D 17/165 |
| | | | | 415/150 |
| 2004/0096316 A1 | | 5/2004 | Simon et al. | |
| 2005/0160731 A1 | | 7/2005 | Arnold et al. | |
| 2009/0123272 A1 | | 5/2009 | Love et al. | |
| 2011/0038714 A1 | | 2/2011 | Carter et al. | |

OTHER PUBLICATIONS

Japanese Office Action dated Jun. 22, 2018 ; Application No. 2016-545221; Applicant: BorgWarner Inc.; 7 pages.

Chinese Office Action dated Jun. 26, 2018 ; Application No. 201480051118.5; Applicant: BorgWarner Inc.; 7 pages.

\* cited by examiner

ACTUATING MECHANISM AND GEAR DRIVEN ADJUSTMENT RING FOR A VARIABLE GEOMETRY TURBOCHARGER

CROSS-REFERENCE TO RELATED APPLICATIONS

This application claims priority to and all the benefits of U.S. Provisional Application No. 61/884,289, filed on Sep. 30, 2013, and entitled "Actuating Mechanism and Gear Driven Adjustment Ring For A Variable Geometry Turbocharger," which is incorporated herein by reference.

BACKGROUND

1. Field of the Disclosure

This disclosure relates to an actuation mechanism for the adjustment ring of a variable turbine geometry turbocharger. More particularly, this disclosure relates to a gear driven adjustment ring to adjust the turbine vanes in a variable turbine geometry turbocharger and to a resiliently mounted actuation mechanism for the adjustment ring in the variable turbine geometry turbocharger.

2. Description of Related Art

A turbocharger is a type of forced induction system used with internal combustion engines. Turbochargers deliver compressed air to an engine intake, allowing more fuel to be combusted, thus boosting the horsepower of the engine without significantly increasing engine weight. Turbochargers allow for the use of smaller engines having the same amount of horsepower as larger, normally aspirated engines. The use of a smaller engine in a vehicle decreases the mass of the vehicle, increases performance, and enhances fuel economy. Moreover, turbochargers provide a more complete combustion of the fuel delivered to the engine, which contributes to the highly desirable goal of a cleaner environment.

Turbochargers typically include a turbine housing connected to the exhaust manifold of the engine, a compressor housing connected to the intake manifold of the engine, and a center bearing housing coupled between the turbine and compressor housings. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it increases the air mass flow rate, airflow density and air pressure delivered to cylinders of the engine via the intake manifold.

A turbocharger provides an ideal boost in only a limited range of conditions. Thus, a larger turbine for a given engine provides good boost at high speeds, but does not do well at low speeds because it suffers turbo lag and is thus unable to provide boost when needed. A small turbine provides good boost at low speeds, but can choke the engine at high speeds. One solution to this problem is to provide the turbocharger with a variable geometry turbine (VGT) having movable vanes in the turbine housing. At low speeds, when boost is needed quickly, the vanes can be closed creating a narrower passage for the flow of exhaust gas. The narrow passage accelerates the exhaust gas towards the turbine wheel blades allowing the turbocharger to provide a boost of power to the engine when needed. On the other hand when the engine is running at high speed and the pressure of the exhaust gas is high, the vanes may be opened and the turbocharger provides the appropriate amount of boost to the engine for the associated speed. By allowing the vanes to open and close, the turbocharger is permitted to operate under a wide variety of driving conditions as power is demanded by the engine. As such, the vanes are frequently adjusted using an adjustment ring mechanism. The vanes are attached to a shaft which is in turn attached to vane arms that engage pins disposed on an adjustment ring. Thus, the position of each vane is adjusted in unison with the other vanes as the adjustment ring is rotated. The adjustment ring is driven by an actuator, and is connected to the actuator by various mechanical drive linkages well known in the art. Unfortunately, some currently available linkages are imprecise and suffer from hysteresis.

SUMMARY

VGT turbochargers include movable vanes that are located in the turbine housing. The vanes rotate relative to the turbine housing to adjust the amount of exhaust gas flow to the turbine wheel, thereby allowing the turbocharger to operate properly under a wide variety of conditions. When the vanes are closed at low speeds, the exhaust gas is accelerated towards the turbine wheel blades allowing the turbocharger to provide the needed boost. At high speeds, the vanes are open decreasing the exhaust flow towards the turbine wheel blades and adjusting the boost as needed. The VGT turbocharger includes a gear driven adjustment ring actuator mechanism that is configured to precisely move the vanes in the turbine housing with reduced hysteresis as compared to some VGT turbochargers in which the vanes are typically adjusted using a block driven adjustment ring actuator mechanism.

According to one aspect of the disclosure, a gear driven adjustment ring actuator mechanism is provided for controlling the rotational movement of the adjustment ring of a variable turbine geometry turbine wherein the vanes are moved using a rack gear and pinion system. The rack gear is located relative the adjustment ring such that the teeth of the rack gear are disposed outwardly relative to an outer edge of the adjustment ring. By this arrangement, interference of the rack gear with the complex vane adjustment components is avoided. The rack gear can be formed so that the rack gear teeth face radially inwardly, or alternatively can be formed so that the rack gear teeth face radially outwardly.

According to another aspect of the disclosure, each vane is connected to the adjustment ring via a vane arm. The vane arms rotate the vanes in response to movement of the pinion gear with respect to the rack of the gear driven adjustment ring actuator.

According to another aspect of the disclosure, the rack gear is an integral portion of the adjustment ring wherein the gears are cut into the adjustment ring. Vane arms and a pinion gear may be used to rotate the vanes.

According to another aspect of the invention, each vane arm may be provided with a geared radially-outward facing edge that engages corresponding gear teeth formed on a radially inward edge of the adjustment ring, whereby rotation of the pinion causes rotation of the adjustment ring, which in turn causes rotation of each vane arm via the geared connection therebetween.

According to another aspect of the disclosure, the rack gear is separate from and then attached to the adjustment ring such that the teeth of the rack gear are disposed at the same radially outward position as the outer edge of the adjustment ring. By forming the rack gear as a separate entity, it can advantageously be formed of a different material than the remainder of the adjustment ring. For example, the rack gear can be formed of a relatively expensive, highly wear resistant material as compared to the remainder of the adjustment ring, whereby durability of the adjustment ring can be improved, and manufacturing costs can be reduced relative to an adjustment ring formed entirely of the highly wear resistant material.

According to another aspect of the disclosure, the gear driven adjustment ring actuator mechanism is provided with a resilient mount disposed between the bearing housing and a bushing disposed about a shaft of the actuating mechanism.

According to another aspect of the disclosure, a gear drive is provided for controlling an adjustment ring of a variable turbine geometry turbine. The adjustment ring includes rack gear and rotates in response to the motion of a pinion (e.g., drive) gear. The pinion gear rotates in response to actuation by an actuator.

According to yet another aspect of the disclosure, a block driven adjustment ring is also combined with the use of a resilient mount disposed between the bearing housing and a bushing positioned about the shaft of the actuating mechanism.

BRIEF DESCRIPTION OF THE DRAWINGS

Advantages of the disclosure will be readily appreciated as the same becomes better understood by reference to the following detailed description when considered in connection with the accompanying drawings wherein.

DETAILED DESCRIPTION

Figure 1:
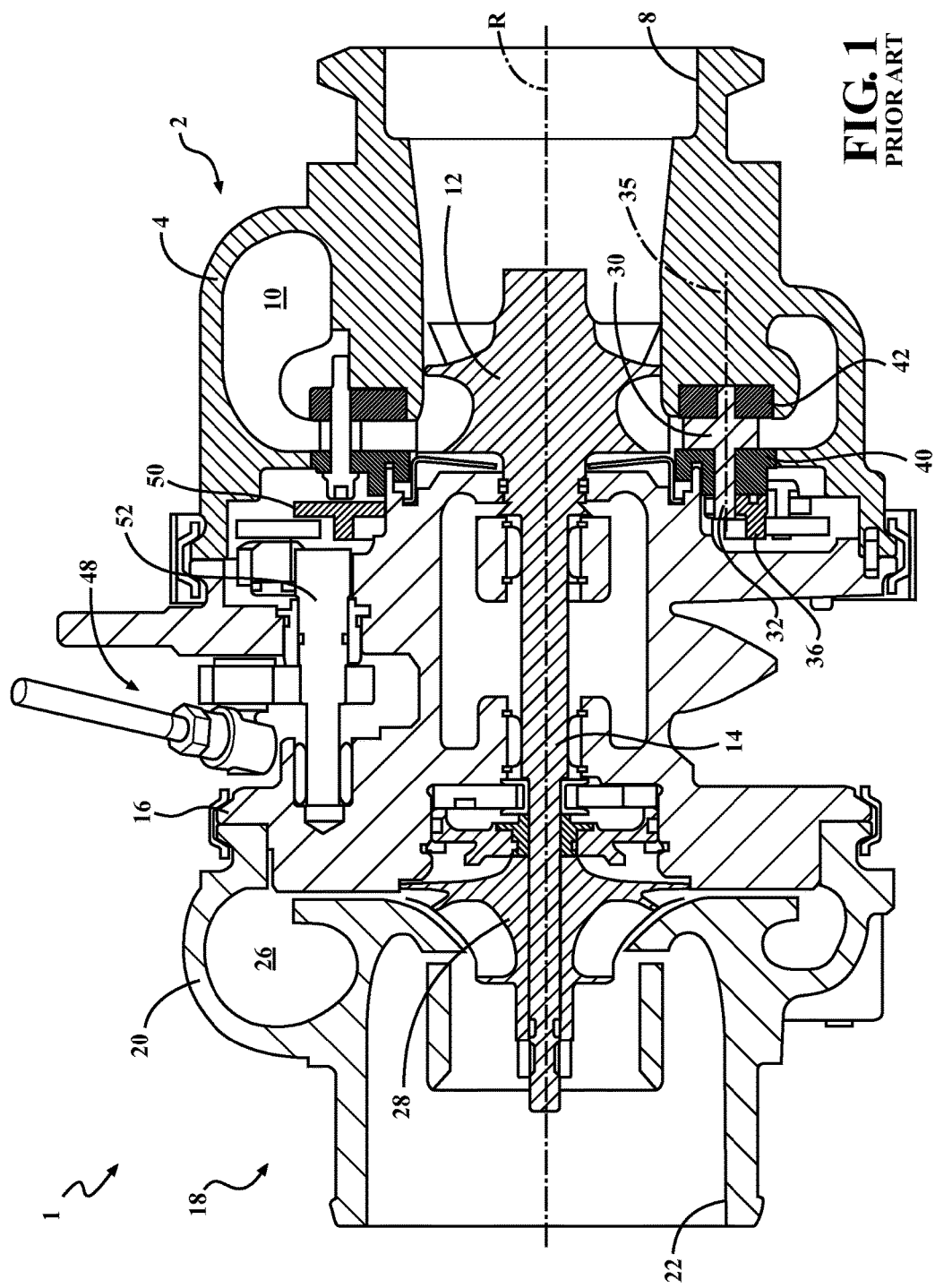
FIG. 1 is a cross-sectional view of a conventional exhaust gas turbocharger including a variable geometry turbine.

Referring to FIG. 1, a conventional exhaust gas turbocharger 1 includes a turbine section 2, the compressor section 18, and a center bearing housing 16 disposed between and connecting the compressor section 18 to the turbine section 2. The turbine section 2 includes a turbine housing 4 that defines an exhaust gas inlet (not shown), an exhaust gas outlet 8, and a turbine volute 10 disposed in the fluid path between the exhaust gas inlet and the exhaust gas outlet 8. A turbine wheel 12 is disposed in the turbine housing 4 between the turbine volute 10 and the exhaust gas outlet 8. A shaft 14 is connected to the turbine wheel 12, is supported for rotation about a rotational axis R within in the bearing housing 16, and extends into the compressor section 18. The compressor section 18 includes a compressor housing 20 that defines an axially-extending air inlet 22, an air outlet (not shown), and a compressor volute 26. A compressor wheel 28 is disposed in the compressor housing 20 between the air inlet 22 and the compressor volute 26, and is connected to the shaft 14.

In use, the turbine wheel 12 in the turbine housing 4 is rotatably driven by an inflow of exhaust gas supplied from the exhaust manifold of an engine (not shown). Since the shaft 14 connects the turbine wheel 12 to the compressor wheel 28 in the compressor housing 20, the rotation of the turbine wheel 12 causes rotation of the compressor wheel 28. As the compressor wheel 28 rotates, it increases the air mass flow rate, airflow density and air pressure delivered to the engine's cylinders via an outflow from the compressor air outlet, which is connected to the engine's air intake manifold.

The turbocharger 1 is a variable turbine geometry turbocharger (VTG). In particular, the turbine section 2 includes a plurality of pivotable vanes 30 to control the flow of exhaust gas that impinges on the turbine wheel 12 and control the power of the turbine section 2. The vanes 30 also therefore control the pressure ratio generated by the compressor section 18. In engines that control the production of NOx by the use of High Pressure Exhaust Gas Recirculation (HP EGR) techniques, the vanes 30 also provide a means for controlling and generating exhaust back pressure.

Figures 2, 3:
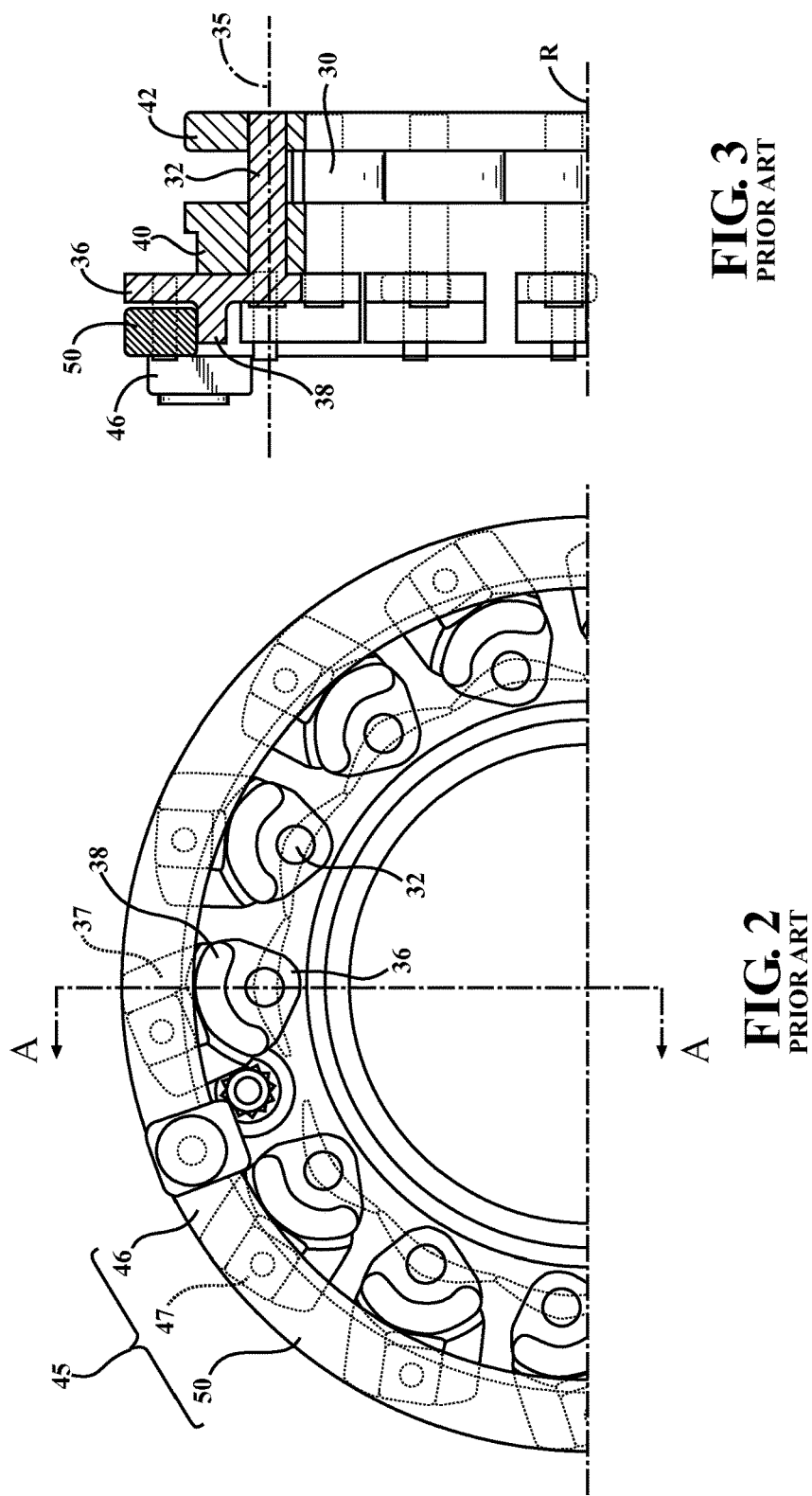
FIG. 2 is a side view of an adjustment ring assembly of the turbocharger of claim 1.
FIG. 3 is a cross-sectional view of the adjustment ring assembly as seen along line A-A of FIG. 2

Referring also to FIGS. 2-3, the vanes 30 are arranged in a circular array around the turbine wheel 12, and are located between the turbine volute 10 and the turbine wheel 12. The vanes 30 are pivotably supported in this configuration between a generally annular upper vane ring 40 and a generally annular lower vane ring 42, where "upper" refers to being closer to the center bearing housing 16, and "lower" refers to being closer to the turbine housing 4. Each vane 30 rotates on a post 32 that protrudes from the opposed side faces of the vane 30, with the post 32 defining a pivot axis 35. The free ends of the post 32 are received in respective apertures in the upper vane ring 40 and the lower vane ring 42. The angular orientation of the upper vane ring 40 relative to the lower vane ring 42 is set such that the corresponding apertures in the vane rings 40, 42 are concentric with the axis 35 of the posts 32, and the vane 30 is free to rotate about the axis 35. On the upper vane ring-side of the vane 30, the post 32 protrudes through corresponding aperture of the upper vane ring 40 and is affixed to a vane arm 36, which controls the rotational position of the vane 30 with respect to the vane rings 40, 42. An adjustment ring assembly 45 is arranged adjacent to, and in parallel with, the upper vane ring 40, and controls the position of all of the vane arms 36 in unison.

The adjustment ring assembly 45 includes the adjustment ring 50, small slide blocks 47 rotatably disposed on the turbine-facing side of the adjustment ring 50, and a large block 46 that is rotatably disposed on the compressor-facing side the adjustment ring 50 and is used to connect the adjustment ring 50 to an actuator. In use, the adjustment ring assembly 45 rotatably drives the vanes 30 via the vane arms 36, which link the adjustment ring assembly 45 to the individual vanes 30. In many configurations, forks 37 are formed on the ends of the vane arms 36 drive the independently rotatable slide blocks 47 to minimize friction in the system and to accommodate distortion and corrosion in the turbine housing, and thus the linkages. The adjustment ring 50 is allowed to rotate circumferentially with minimal friction, and is aligned radially so that it remains concentric with the upper and lower vane rings 40, 42, and axially so that the slide blocks 47 remain in contact with the vane arms 36.

In some embodiments the adjustment ring 50 is supported by ramparts 38 on the vane arms 36. The large block 46 is connected by a shaft to the adjustment ring 50. Circumferential motion of the large block 46 about the turbocharger rotational axis R causes the adjustment ring 50 to rotate about the turbocharger rotational axis R. Rotation of the adjustment ring 50 about the turbocharger rotational axis R causes the multiple small slide blocks 47 to rotate about the turbocharger rotational axis R while each of the slide blocks 47 also rotate about the rotational axis 35 of the vane posts 32. This motion of the slide blocks 47 causes the vane arms 36 to rotate about the rotational axis 35 of the vane posts 32 and change the angle of attack of the vanes 30 relative to the exhaust flow. The slide blocks 47 are designed so that the interface between each slide block 47 and the corresponding vane arm fork 37 is predominantly sliding friction over the entire area of one cheek of the rotating slide block 47. This design provides uniform load distribution, which reduces wear and provides greater life than in line contact, but conversely raises friction over that of a line contact design.

The rotational orientation of the adjustment ring 50 is controlled by an actuator (not shown) which is operatively connected to the large block 46 via a linkage 48 and an actuator pivot shaft 52 (FIG. 1), whereby the adjustment ring 50 can rotated about the rotational axis R. The actuator receives commands from the engine electronic control unit (ECU).

Figure 4:
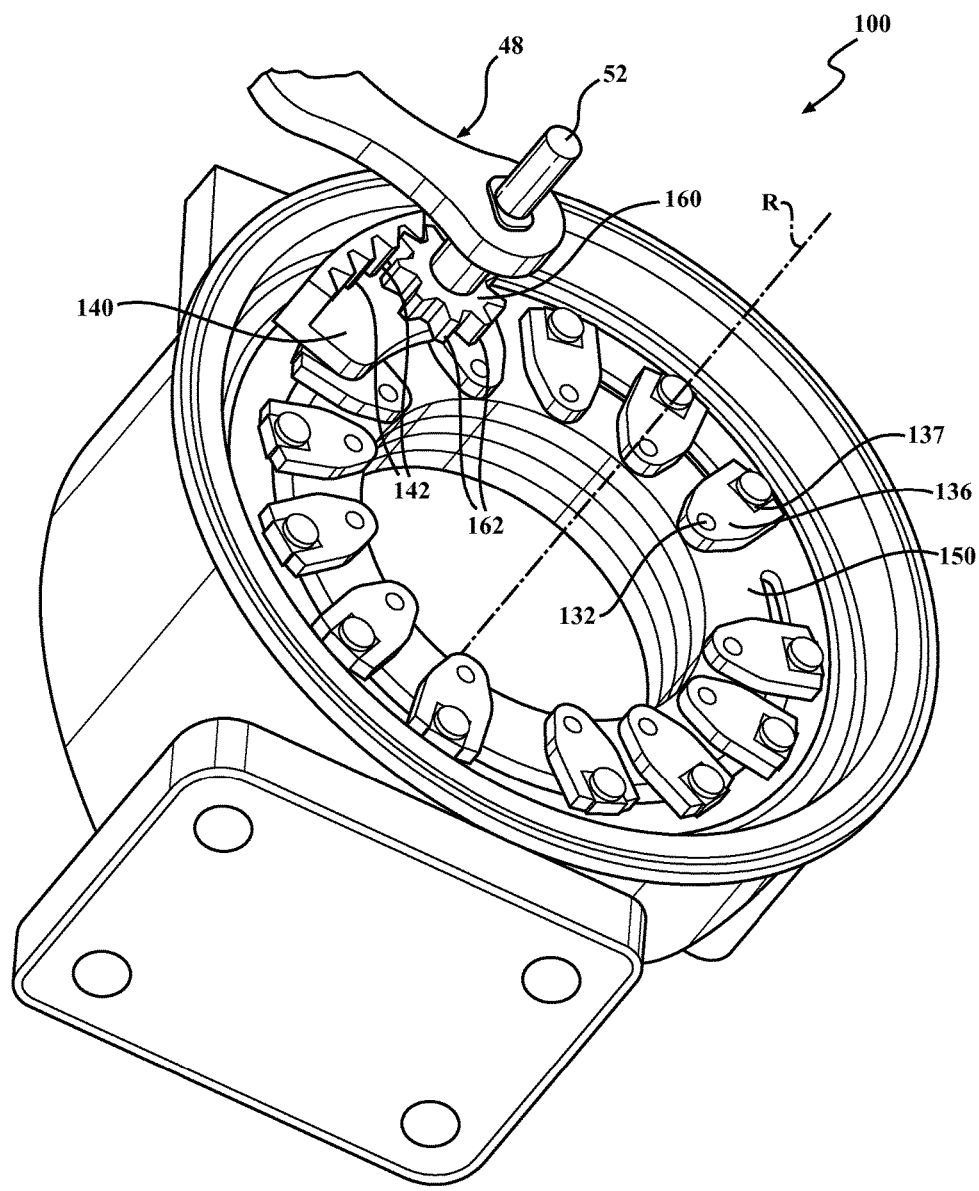
FIG. 4 is a perspective view of a gear driven adjustment ring actuator mechanism including an adjustment ring having a radially inwardly-facing rack gear.

Referring to FIG. 4, a gear driven adjustment ring actuator mechanism 100 is used to replace portions of the conventional adjustment ring assembly and actuation mechanism described above. The gear driven adjustment ring actuator mechanism 100 is configured to control the rotational movement of the adjustment ring 150 of a variable turbine geometry turbine with greater precision and less hysteresis than some conventional configurations. The gear driven adjustment ring actuator mechanism 100 includes an adjustment ring 150 including a plurality of sliding blocks 137, a rack gear 140 having rack gear teeth 142, a forked vane arm 136 mounted on a vane post 132, and a pinion gear 160 having pinion gear teeth 162. The pinion gear 160 is connected to the actuator via the actuator pivot shaft 52 and linkage 48. The rack gear 140 includes teeth 142 formed on a radially inward-facing surface thereof for engagement with the teeth 162 of the pinion gear 160. The rack gear teeth 142 face inwardly toward the turbocharger shaft rotational axis R, and are positioned radially outwardly relative to an outer edge of the adjustment ring 150. Placement of the rack gear teeth 142 outward relative to an outer edge of the adjustment ring 150 provides sufficient clearance for operation of the actuator pivot shaft 52 and pinion gear 160, and prevents the rack gear 140 from interfering with other moving turbocharger components. The rack gear 140 is formed separately from the adjustment ring 150 but is attached thereto by any conventional attachment method.

In response to actuation of the mechanical drive linkages 48, the pinion gear 160 rotates, causing rotation of the adjustment ring 150 via the mutual engagement of the pinion gear teeth 162 and rack gear teeth 142. Rotation of the adjustment ring 150, in turn, results in rotation of the individual vane arms 136 and vanes 30 (not shown in this view) via the sliding blocks 137.

Figure 5:
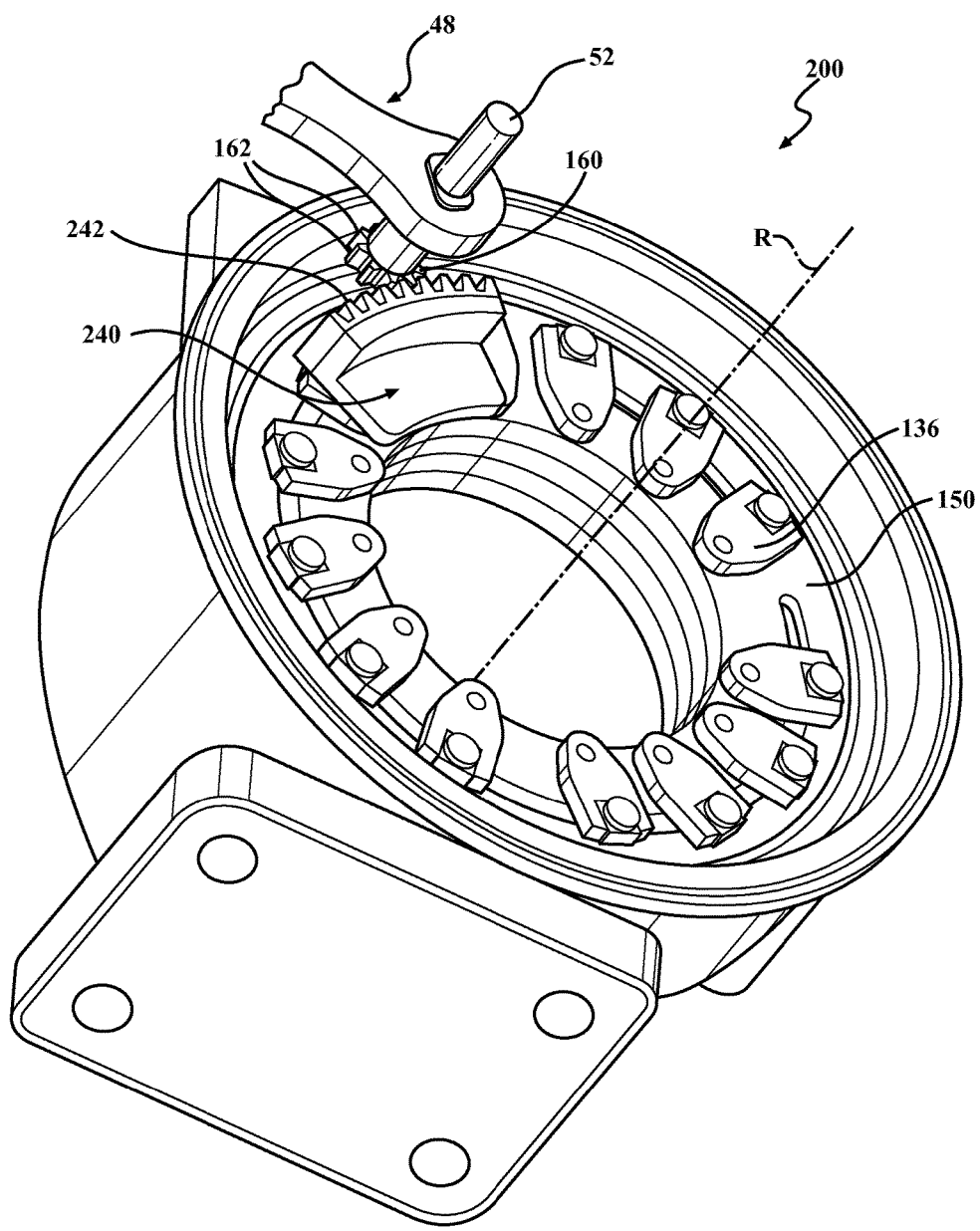
FIG. 5 is a perspective view of another gear driven adjustment ring actuator mechanism including an adjustment ring having a radially outwardly-facing rack gear.

Referring to FIG. 5, an alternative gear driven adjustment ring actuator mechanism 200 is configured to control the rotational movement of the adjustment ring 150 of a variable turbine geometry turbine with greater precision and less hysteresis than some conventional configurations. The gear driven adjustment ring actuator mechanism 200 is similar to the mechanism 100 of FIG. 4, and common components are referenced with common reference numbers. The alternative gear driven adjustment ring actuator mechanism 200 includes a rack gear 240 having rack gear teeth 242 formed on a radially outward-facing surface of the rack gear 240. In addition, the rack gear teeth 242 face away from the turbocharger shaft rotational axis R. While the rack gear teeth 242 are formed on an outer surface of the rack gear 240, the rack gear teeth 242 are still disposed radially outwardly relative to an outer edge of the adjustment ring 150 and operate similarly to the gear driven adjustment ring actuator mechanism 100 of FIG. 4.

Figure 6:
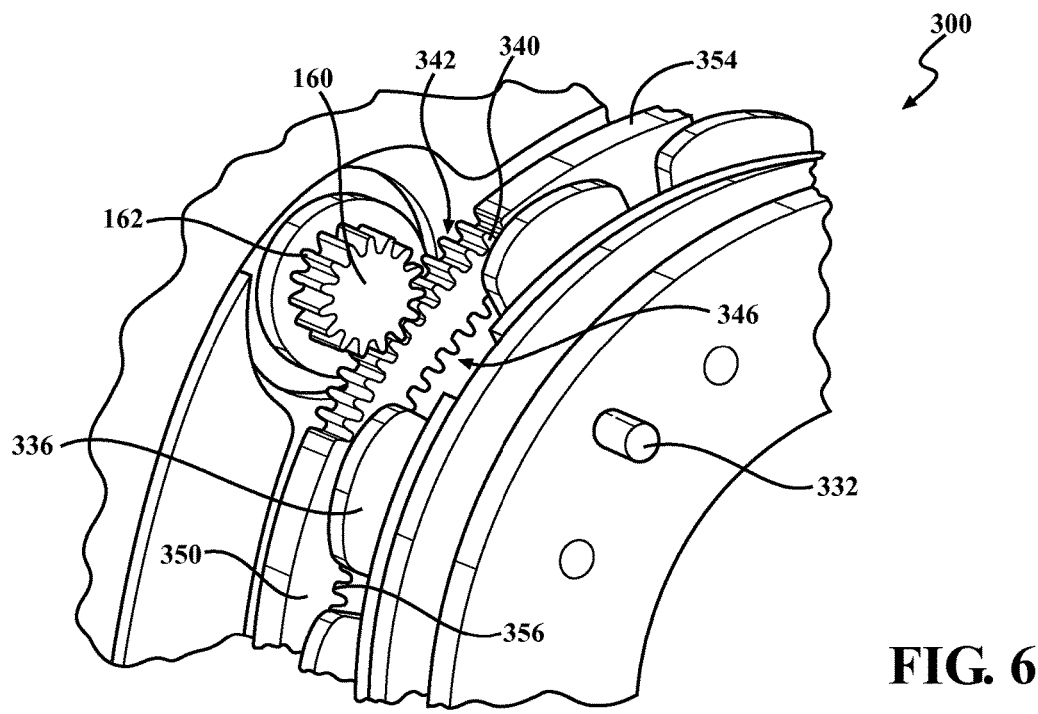
FIG. 6 is a perspective view of another gear driven adjustment ring actuator mechanism including an adjustment ring having an integrally formed rack gear.
Figure 7:
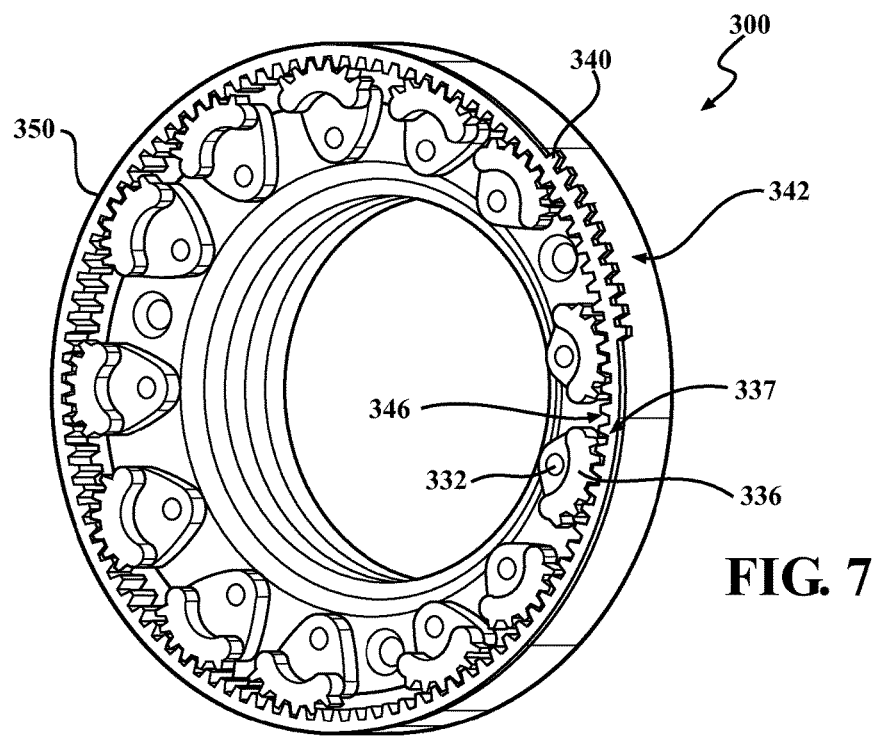
FIG. 7 is a perspective view of the gear driven adjustment ring actuator mechanism of FIG. 6 as seen from the opposed side thereof.
Figure 8:
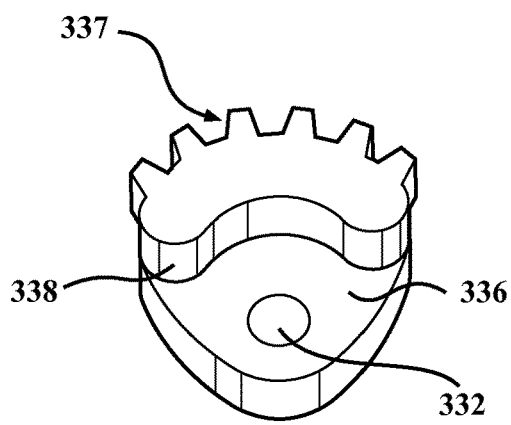
FIG. 8 is a perspective view of a geared vane arm of the gear driven adjustment ring actuator mechanism of FIG. 6.

Referring to FIGS. 6-8, another alternative gear driven adjustment ring actuator mechanism 300 is configured to control the rotational movement of the adjustment ring 350 of a variable turbine geometry turbine with greater precision and less hysteresis than some conventional configurations. The gear driven adjustment ring actuator mechanism 300 includes an adjustment ring 350 having a rack gear 340, a vane arm 36 mounted on a vane post 32, and the pinion gear 160 having pinion gear teeth 162. The gear driven adjustment ring actuator mechanism 300 also includes geared vane arms 336. For example, each of the geared vane arms 336 includes a set of teeth 337 formed on a radially outward-facing surface of the vane arm rampart 338 (FIG. 8).

The rack gear 340 of the adjustment ring 350 includes a first set of teeth 342 integrally formed along at least a portion of a radially outward-facing edge 354 (e.g., the outer diameter) of the adjustment ring 350. The pinion gear teeth 162 engage the first set of teeth 342 formed on the radially outward-facing edge 354 of the adjustment ring 350 (FIG. 6). The first set of teeth 342 are used to rotate the adjustment ring 350 about the turbocharger rotational axis R in response to movement of the pinion gear 160.

The adjustment ring 350 includes a second set of teeth 346 integrally formed along the entire circumference of a radially inward-facing edge 356 (e.g., the inner diameter) of the adjustment ring 350 (FIG. 7). The second set of teeth 346 of the adjustment ring 350 are configured to engage the corresponding set of teeth 337 of the geared vane arm 336, whereby rotation of the adjustment ring 350 results in a corresponding rotation of each vane arm 336. The rotation of each vane arm 336 is transferred to its respective vane 30 via the vane post 332.

Figure 9:
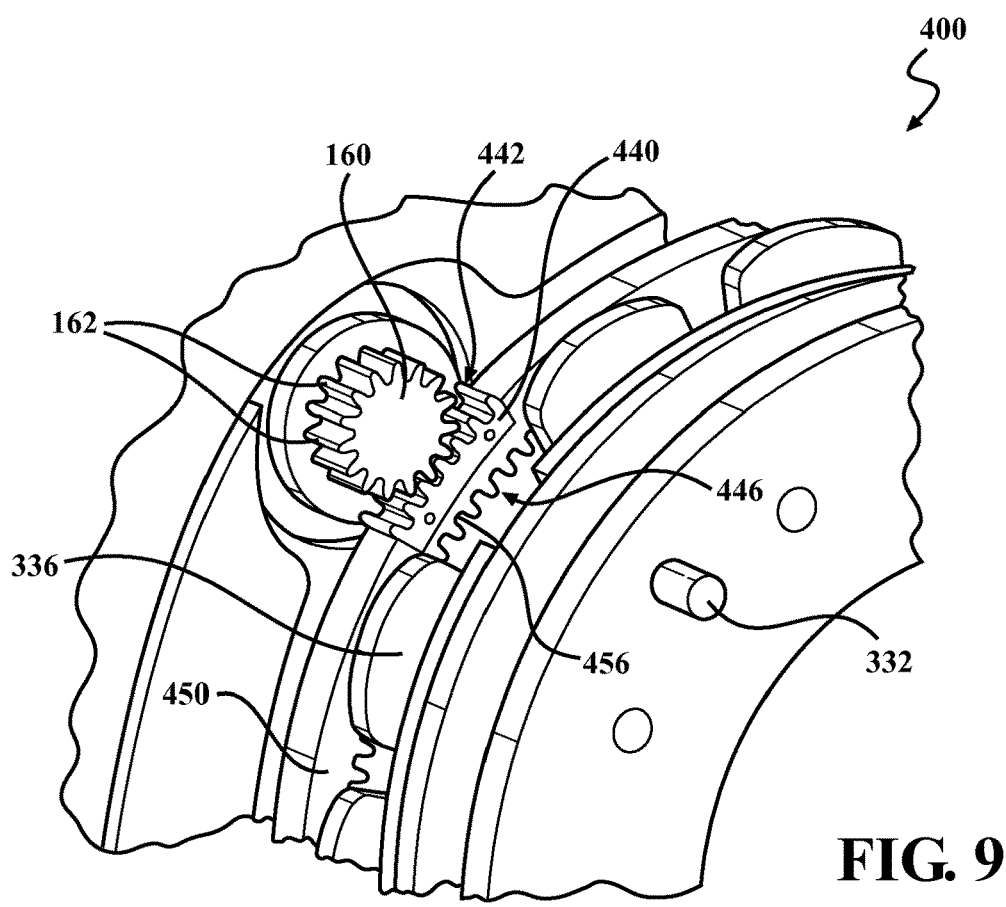
FIG. 9 is a perspective view of another gear driven adjustment ring actuator mechanism including an adjustment ring having an attached rack gear.

Referring to FIG. 9, another alternative gear driven adjustment ring actuator mechanism 400 is configured to control the rotational movement of the adjustment ring 450 of a variable turbine geometry turbine with greater precision and less hysteresis than some conventional configurations. The gear driven adjustment ring actuator mechanism 400 includes an adjustment ring 450 having a rack gear 440, geared vane arms 336 mounted on corresponding vane posts 332, and the pinion gear 160 having the pinion gear teeth 162.

The rack gear 440 of the adjustment ring 450 is formed separately from the adjustment ring 450 and is attached thereto by any conventional attachment method. Forming the rack gear 440 separately from the adjustment ring 450 advantageously permits strategic selection of materials used to form these components. For example, in some embodiments, the rack gear 440 can be formed of a relatively expensive, highly wear resistant material as compared to the remainder of the adjustment ring 450, whereby the durability of the adjustment ring 450 can be improved, and manufacturing costs can be reduced relative to an adjustment ring that is formed entirely of the highly wear resistant material.

The rack gear 440 is disposed on the adjustment ring 450 such that the rack gear teeth 442 are formed on a radially outward-facing surface of the rack gear 440 for engagement with the pinion gear teeth 162. The rack gear 440 is attached to the adjustment ring 450 such that the rack gear teeth 442 are disposed at the same radial position as the radially outward-facing edge 454 of the adjustment ring 450. The pinion gear teeth 162 engage the rack gear teeth 442, and the rack gear teeth 442 are used to rotate the adjustment ring 450 about the turbocharger rotational axis R in response to movement of the pinion gear 160.

The adjustment ring 450 includes a second set of teeth 446 integrally formed along the entire circumference of a radially inward-facing edge 456 (e.g., the inner diameter) of the adjustment ring 450. The second set of teeth 446 of the adjustment ring 450 are configured to engage the corresponding set of teeth 337 of the geared vane arm 336, whereby rotation of the adjustment ring 450 results in a corresponding rotation of each vane arm 336. The rotation of each vane arm 336 is transferred to its respective vane 30 via the vane post 332.

During operation of the gear driven adjustment ring actuator mechanism 100, 200, 300, 400, the adjustment ring 150, 250, 350, 450 is rotated about the turbocharger rotational axis R by rotation of the pinion gear 160 via engagement of the pinion gear teeth 162 with the rack gear teeth 142, 242, 342, 442. In particular, clockwise rotation of the pinion gear 160 causes a counter clockwise rotation of the adjustment ring 150, 250, 350, 450. The pinion gear 160 has fewer teeth 162 than the teeth 142, 242, 342, 442 formed in the rack gear 140, 240, 340 440. Accordingly, a larger rotation of the pinion gear 160 produces a smaller rotation of the adjustment ring 150, 250, 350, 450. A gear ratio of the rack gear teeth 142, 242, 342, 442 to the pinion gear teeth 162 in the range of 3:1 to 6:1 has been found to work well; however, the gear ratio is not limited to this range.

The gear driven adjustment ring actuator mechanism 100, 200, 300, 400 may be actuated by an actuator capable of rotating a shaft. The gear ratios may be set so that rotation matches rotation of the actuator (e.g., a gear ratio of 1:1), and can be adjusted to provide the overall gear ratio to allow the actuator to control the vanes 30. It is also conceived that an actuator can be provided on the bearing housing permitting direct drive of the adjustment ring 150, 350, 450.

Alternatively, the gear driven adjustment ring actuator mechanism 100, 200, 300, 400 may be turned by a linear actuator connected through a linkage which converts linear motion to rotary motion. Unless the linkage is extensive, and perhaps also complicated, the conversion of a linear displacement of the actuator to rotation of a shaft is generally not linear. For example, if a linear displacement of 5 millimeters produces a rotation of 10 degrees, a linear displacement of 10 millimeters will not produce 20 degrees of rotation. Fortunately, the vanes 30 do not require rotation over large angles. As such, over the small angles of rotation that the vanes 30 typically move, the nonlinearity is minimal and can generally be ignored. The nonlinearity for less complicated linkage is readily calculable. If necessary, the turbocharger controller or engine controller unit can easily makes corrections associated with any occurrence of nonlinearity.

The gear driven adjustment ring actuator mechanism 100, 200, 300, 400 is capable of transmitting the rotary motion of a shaft to an adjustment ring 150, 350, 450. As previously discussed, in a variable geometry turbocharger 1, hot exhaust gases are directed to the turbine wheel 12 by the vanes 30, which are moved by the adjustment ring 150, 350, 450. However, heat from the vanes 30 is conducted to the adjustment ring 150, 350, 450 and from the adjustment ring 150, 350, 450 to the shaft 14 of the turbocharger 1. Thermal expansion of the turbocharger components may have negative effects on operation and durability.

Figure 10:
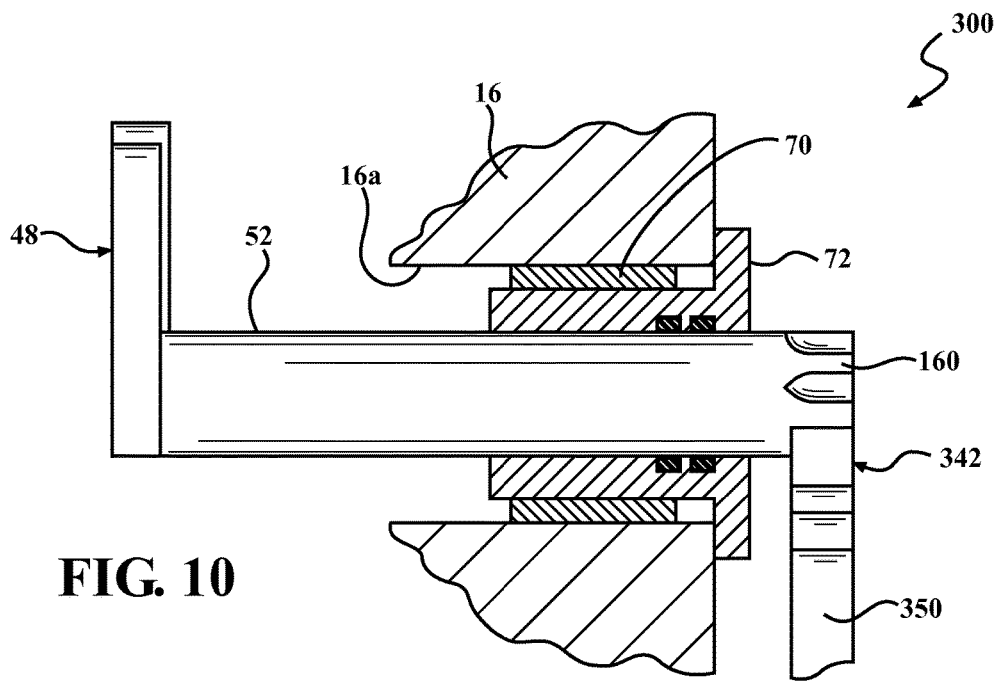
FIG. 10 is a cross-sectional view of a portion of the bearing housing that supports the gear driven adjustment ring actuator mechanism of FIG. 6 illustrating a resilient member disposed between the bearing housing and the actuator pivot shaft.

Referring to FIG. 10, the gear driven adjustment ring actuator mechanism 100, 200, 300, 400 may include a resilient mount 70 disposed between the actuator pivot shaft 52 and the bearing housing 16 and used to reduce the negative effects of heat conduction between the gear driven adjustment ring actuator mechanism 100, 200, 300, 400 and the bearing housing 16. Although illustrated herein with respect to the gear driven adjustment ring actuator mechanism 300 illustrated in FIG. 6, the resilient mount 70 can be employed in all embodiments of the mechanism.

The resilient mount 70 is an elastic and resilient hollow cylindrical member. The resilient mount 70 has an outer diameter that corresponds to the inner diameter of an opening 16a in the bearing housing that receives the actuator pivot shaft 52. A bushing 72 is disposed concentrically within the resilient mount 70 and has an outer diameter that corresponds to the inner diameter of the resilient mount 70. The busing 72 is configured to receive an end portion of the actuator pivot shaft 52. The resilient mount 70 and the bushing 72 are disposed in the opening 16a and rotatably support the actuator pivot shaft 52 relative to the bearing housing 16. Thus, the bushing 72 is located between the actuator pivot shaft 52 and the resilient mount 70, and the resilient mount 70 is disposed between the bushing 72 and the bearing housing 16. In the illustrated embodiment, the actuator pivot shaft 52 is rotated by the actuator via the linkage 48, but is not limited thereto. As previously discussed, rotation of the actuator pivot shaft 52 causes rotation of the pinion gear 160 connected thereto, movement of the gear adjustment ring actuator mechanism 300, and thus also movement of the vanes 30.

In operation, a portion of the exhaust gas heat is transferred to the actuator pivot shaft 52, causing elements in contact with the actuator pivot shaft 52 to expand. For example, the bushing 72 can reach temperatures in the range of 350-450° C. As the bushing 72 and actuator pivot shaft 52 expand due to the high temperatures in the turbocharger, the resilient mount 70, positioned between the actuator pivot shaft 52 and the bearing housing 16, expands in response. When the actuator pivot shaft 52 cools down, the resilient mount 70 returns to its original shape. Elasticity of the resilient mount 70 allows the actuator components, including the actuator pivot shaft 52 and bushing 72, to expand with heating and contract with cooling and still maintain contact with the adjustment ring 350. In addition, the resilient mount 70 dampens vibrations that might occur during operation of the turbocharger.

The resilient mount 70 can have a wide variety of shapes, and the shape of the resilient mount 70 dictates the actual amount of resilience provided by the resilient mount 70. The resilient mount 70 is generally circular in cross-sectional shape, and includes projections 74 that are directed radially inward and have various shapes. Exemplary shapes of the resilient mount projections 74 are illustrated in FIGS. 11a-11d.

Materials suitable for forming the resilient mount (74) include, but are not limited to, steel, spring steel, and heat resistant stainless steels such as grade 310 steel and grade 2111HTR steel. Materials which are suitable for use in forming the bushing 72 include, but are not limited to, copper, bronze, brass, steel and stainless steel.

Figure 12:
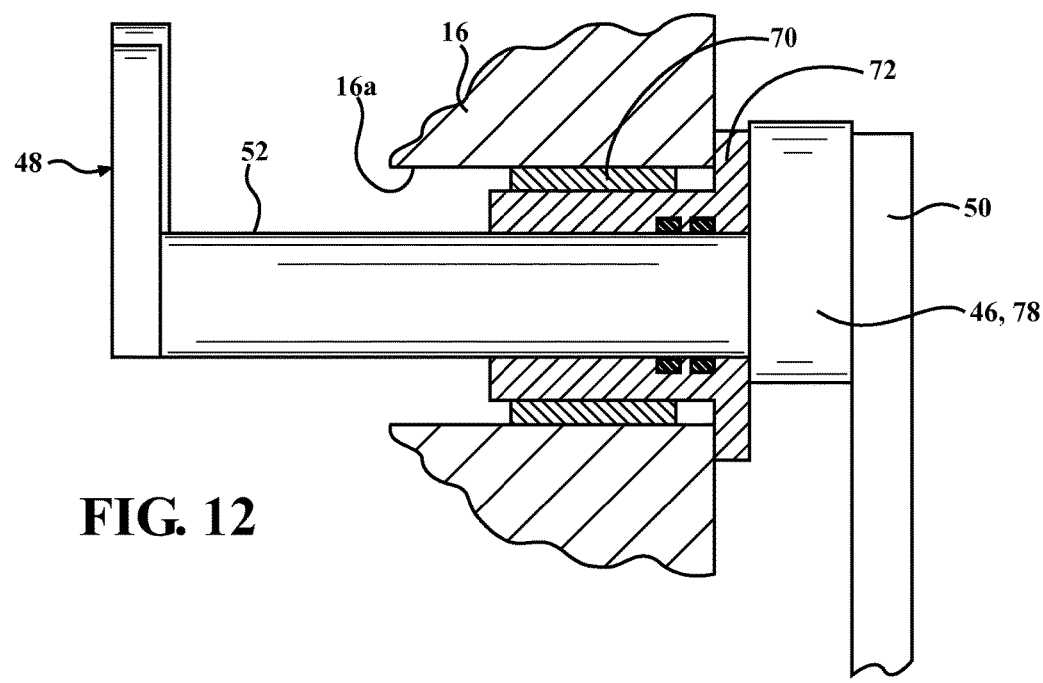
FIG. 12 is a cross-sectional view of a portion of the bearing housing that supports the conventional block driven adjustment ring actuator mechanism of FIG. 1 illustrating the resilient member disposed between the bearing housing and the actuator pivot shaft.
Figure 11A:
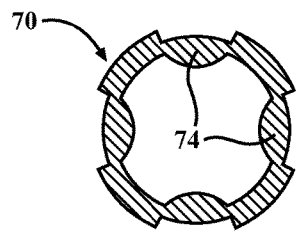
FIGS. 11a-11d are cross sectional views detailing various cross-sectional shapes of the resilient element of FIG. 10.
Figure 11B:
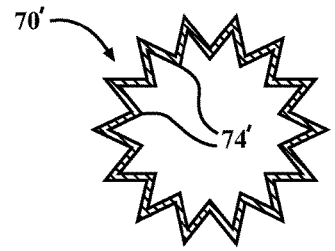
Figure 11C:
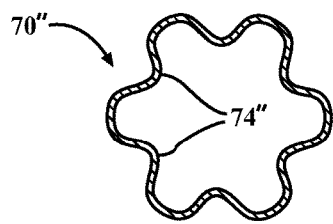
Figure 11D:
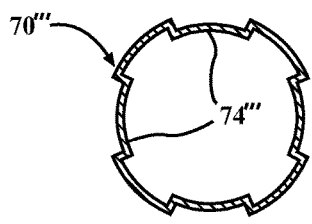
Figure 13:
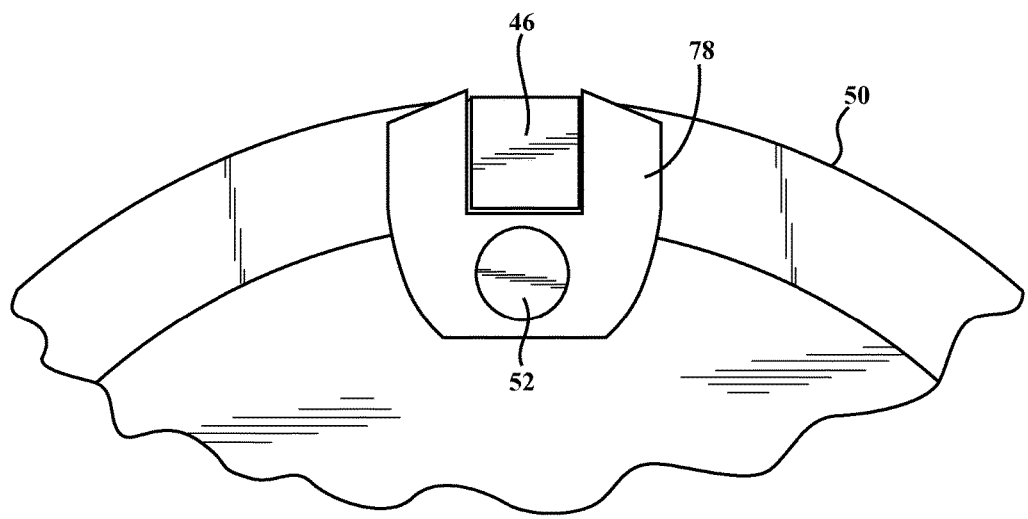
FIG. 13 is a detailed end view of the block driven adjustment ring actuator mechanism of FIG. 12.

Referring to FIGS. 12 and 13, although the resilient mount 70 can be advantageously employed in turbocharger 1 that includes the gear driven adjustment ring actuator mechanism 100, 200, 300, 400, the resilient mount can also be deployed in a conventional VTG actuation mechanism such as a block driven mechanism illustrated in FIG. 2. For example, the resilient mount 70 and the bushing 72 are disposed in the opening 16a and rotatably support the actuator pivot shaft 52 relative to the bearing housing 16. Thus, the bushing 72 is located between the actuator pivot shaft 52 and the resilient mount 70, and the resilient mount 70 is disposed between the bushing 72 and the bearing housing 16. As shown in FIG. 13, the block driven mechanism includes a forked member 78 attached to an end of the actuator pivot shaft 52. The forked member 78 partially surrounds the large block 46 that is connected to the adjustment ring 50. Rotation of the actuator pivot shaft 52 causes rotation of the forked member 78 connected thereto, resulting in movement of the adjustment ring 50, and thus also movement of the vanes 30.

The turbine wheel and variable turbine vanes operate in a high temperature environment where the turbine wheel may reach temperatures as high as 1922° F. (1050° C.). In a variable turbine geometry turbocharger, the vane adjustment ring is in the direct path of the exhaust gas. In some instances, parts of the adjustment ring actuator may also be in the direct path of the exhaust gas. However, even if the adjustment ring actuator is not in the direct path of the exhaust gas, heat from the vanes and the adjustment ring can be conducted to the adjustment ring actuator. Accordingly, nickel-based super alloys and heat resistant stainless steels are exemplary materials for the manufacture of the disclosed gear and/or block driven adjustment ring actuator mechanisms. The nickel-based super alloys may generally contain nickel, chromium and iron, although, in certain alloys other metals may be included. Inconel, hastelloy, incoloy, and monel metal alloys are examples of nickel-based super alloys suitable for use in forming the disclosed gear and/or block driven adjustment ring actuator mechanisms. If a heat resistant stainless steel is selected to manufacture the disclosed gear and/or block driven adjustment ring actuator mechanisms, suitable heat resistant stainless steel materials include grade 310 steel and grade 2111HTR steel.

Aspects of the disclosure have been described herein in an illustrative manner, and it is to be understood that the terminology used is intended to be in the nature of words of description rather than limitation. Many modifications and variations of the present disclosure are possible in light of the above teachings. It is, therefore, to be understood that within the scope of the appended claims, the invention may be practiced other than as specifically enumerated within the description.

What is claimed:

1. A gear driven adjustment ring actuator mechanism (100) for a variable turbine geometry turbocharger (1), comprising an adjustment ring (150) including a rack gear (140) and a vane arm (136) attached to a vane (30) configured to vary the geometry of a turbine (2) of the turbocharger (1), wherein the gear driven adjustment ring actuator mechanism (100) is configured to control rotational movement of the vane (30) wherein the adjustment ring (150) includes a first set of gear teeth (346, 446) disposed in alignment with an inner diameter of the adjustment ring (350, 450), further including a pinion gear 160 having pinion teeth (162) and wherein the rack gear (140) includes rack gear teeth (142) that engage with the pinion teeth (162), wherein the adjustment ring (350, 450) further includes a second set of gear teeth (342, 442), disposed in radial alignment with an outer diameter of the adjustment ring (350, 450) so that the pinion teeth engages the rack teeth.

2. The gear driven adjustment ring actuator mechanism (100) according to claim 1 wherein the rack gear (140) is formed separately from the adjustment ring (150).

3. The gear driven adjustment ring actuator mechanism (100) according to claim 1 wherein the adjustment ring (150, 350) and the rack gear (140, 340) are formed as an integral unit.

4. The gear driven adjustment ring actuator mechanism (100) according to claim 1 wherein the rack gear teeth (142) are formed on a radially inward-facing surface of the rack gear (140).

5. The gear driven adjustment ring actuator mechanism (100) according to claim 1 wherein the rack gear teeth (242) are formed on a radially outward-facing surface of the rack gear (240).

6. The gear driven adjustment ring actuator mechanism (100) according to claim 1 wherein the rack gear (140, 240, 440) is attached to the adjustment ring (150, 450) and the rack gear teeth (142, 242, 442) are positioned radially outwardly relative to an outer edge of the adjustment ring (150, 450) and in alignment with an outer diameter of the adjustment ring (150, 450).

7. The gear driven adjustment ring actuator mechanism (100) according to claim 3 further including a pinion gear (160) having pinion teeth (162) and wherein the adjustment ring (350) further includes teeth (342, 346) formed in at least a portion of a radially inward-facing edge (356) and a radially outward-facing edge (354) and wherein the pinion teeth (162) engage with the teeth (342) formed in the radially outward-facing edge (354) of the adjustment ring (350).

8. A gear driven adjustment ring actuator mechanism (100) for a variable turbine geometry turbocharger (1), comprising an adjustment ring (150) including a rack gear (140) and a vane arm (136) attached to a vane (30) configured to vary the geometry of a turbine (2) of the turbocharger (1), wherein the gear driven adjustment ring actuator mechanism (100) is configured to control rotational movement of the vane (30) wherein the adjustment ring (150) includes a first set of gear teeth (346, 446) disposed in radial alignment with an inner diameter of the adjustment ring (350, 450), wherein
    the vane arm (336) includes teeth (337),
    the adjustment ring (350, 450) further includes teeth (346, 446) formed in at least a portion of a radially inward-facing edge and a radially outward-facing edge of the adjustment ring (350, 450), and the teeth (337) of the vane arm (336) engage with the teeth (346, 446) formed in the radially inward-facing edge of the adjustment ring (150).

9. The gear driven adjustment ring actuator mechanism (100) according to claim 1 further including an actuator pivot shaft (52) connected to the gear driven adjustment ring actuator mechanism (100) and the actuator pivot shaft (52) is rotatably supported in a bearing housing (16), wherein a resilient mount (70) is disposed between the actuator pivot shaft (52) and the bearing housing (16).

10. The gear driven adjustment ring actuator mechanism (100) according to claim 6 further including an actuator pivot shaft (52) connected to the gear driven adjustment ring actuator mechanism (100) and the actuator pivot shaft (52) is rotatably supported in a bearing housing (16), wherein a resilient mount (70) is disposed between the actuator pivot shaft (52) and the bearing housing (16).

11. The gear driven adjustment ring actuator mechanism (100) according to claim 7 further including an actuator pivot shaft (52) connected to the gear driven adjustment ring actuator mechanism (100) and the actuator pivot shaft (52) is rotatably supported in a bearing housing (16), wherein a resilient mount (70) is disposed between the actuator pivot shaft (52) and the bearing housing (16).

12. The gear driven adjustment ring actuator mechanism (100) according to claim 8 further including an actuator pivot shaft (52) connected to the gear driven adjustment ring actuator mechanism (100) and the actuator pivot shaft (52) is rotatably supported in a bearing housing (16), wherein a resilient mount (70) is disposed between the actuator pivot shaft (52) and the bearing housing (16).

\* \* \* \* \*